United States Patent [19]

Date et al.

[11] 4,219,260
[45] Aug. 26, 1980

[54] CAMERA HAVING A RELEASE CONTROL DEVICE

[75] Inventors: Nobuaki Date, Kawasaki; Masanori Uchidoi, Yokohama; Hiroshi Aizawa, Kanagawa; Masami Shimizu, Tokyo; Yoshiyuki Takishima, Yokohama, all of Japan

[73] Assignee: Canon Kabushiki Kaisha, Tokyo, Japan

[21] Appl. No.: 883,904

[22] Filed: Mar. 6, 1978

[30] Foreign Application Priority Data

Mar. 11, 1977 [JP] Japan .................. 52/26672
Mar. 11, 1977 [JP] Japan .................. 52/26673

[51] Int. Cl.$^2$ .................. G03B 9/64; G05B 13/02
[52] U.S. Cl. .................. 354/23 D; 354/60 R; 354/23 B
[58] Field of Search .................. 354/23 D, 60 R, 60 A, 354/238

[56] References Cited

U.S. PATENT DOCUMENTS

| | | | |
|---|---|---|---|
| 4,038,675 | 7/1977 | Kitai et al. | 354/23 D |
| 4,057,809 | 11/1977 | Nakamoto et al. | 354/23 D |
| 4,084,166 | 4/1978 | Kawasaki et al. | 354/23 D |

Primary Examiner—John Gonzales
Assistant Examiner—S. D. Schreyer
Attorney, Agent, or Firm—Toren, McGeady and Stanger

[57] ABSTRACT

The present invention relates to a camera having an exposure control device designed so that the light measurement, the exposure condition determination and the photographing operation are carried out by means of a release means including an electromagnet element to be controlled by means of a plural number of switches operating successively with the release operation of the camera. The invention is characterized in that the time at which the output signal of the control circuit for controlling the operation of the camera after the light measurement in accordance with the magnitude of the output signal of the light measuring means is controlled so as to be delayed in such a manner that a correct operation can be obtained even if the light measuring time is short.

37 Claims, 4 Drawing Figures

CAMERA HAVING A RELEASE CONTROL DEVICE

BACKGROUND OF THE INVENTION

The present invention relates to a camera having an exposure control device so designed that the light measurement, the exposure condition determination and the photographing operation are carried out by means of a release means including an electromagnetic element to be controlled by means of a plural number of switches operating successively with the release operation.

In the case of a camera provided with the exposure condition determining device in accordance with the recent electric control system, it is necessary to provide a mechanism for closing the light measurement switch for supplying current to the light measuring circuit, the calculation circuit and so on before the release operation of the camera, for which there exist the following systems;

(1) A system in accordance with which the light measuring switch is closed or opened by manually operating the switch operation member provided at a proper position on the exterior of the camera.

(2) A system in accordance with which the light measuring switch is closed by drawing the winding up lever out into position with a preparation angle and wherein the switch is opened by bringing the lever into the withdrawn position.

(3) A system in accordance with which the light measuring switch is closed with the first step of the push down operation of the release button and the release switch is closed with the second step of the push down operation of the release button.

Thus, if the operation of the light measurement switch is forgotton in taking a picture in the case of the camera of the first system, the camera does not carry out the photographing operation so that there is a danger of losing a shutter opportunity, while, if it is forgotton to open the light measurement switch after having taken a picture the power source is consumed even when the camera is not used. This wasted power, which is inconvenient. In particular, in the case of the camera of the first system, it is necessary to close and open the switch each time a picture is taken. This is also very troublesome.

On the other hand, in the case of the camera of the second system, the winding up lever is operatively engaged with the closing and the opening of the light measurement switch so that there is little danger that the operation of the light measurement switch in taking a picture will be forgotten. There is a danger, however that the winding up lever could be brought back in the withdrawn position by mistake. In this condition, release operation is impossible and the shutter opportunity will be lost. Further, it can be thought that the winding up lever remains at the position with a preparation angle when the camera is not used and the electrical power source is consumed in vain. Further, if the camera of the second system is provided with a motor drive device, the winding up lever can not be operated so that it is necessary to provide a mechanism for changing over the circuit so as to operate the lever by means of the separately arranged light measurement switch. This is not worthwhile because the mechanism as well as the circuit of the camera becomes quite complicated.

In the case of a camera of the third system type, the light measurement switch in operative engagement with the release button is used and therefore the switch is necessarily closed and opened with the release operation in taking a picture. The waste of the power source likely to take place for the first and the second systems never takes place since the light measurement switch is closed for a short time upon releasing the shutter so that the waste of the power source is remarkably small. A camera so designed that current is supplied to each part of the camera, provided with the electromagnetic release device of the third system has already been brought into practice.

In the case of the camera of the third system type in accordance with which the electromagnetic release device is started and the proper exposure is obtained by means of the exposure condition determining device, which is so designed that the light measurement switch is closed by means of the first step of the pushing down operation of the release button so as to start the current supply to the light measuring circuit, the calculation circuit and so on and then the release switch is closed by means of the second step so as to start the electromagnetic release for actuating the photographing operation such as the shutter release, there exists a difference between the time at which the light measurement switch is closed and that at which the release switch is closed. By means of this difference, the electromagnetic release device is operated in a sequential way so as to obtain a proper photographing. However, for example, when the release button is pushed down abruptly, there is a possibility that before the output of the light measuring circuit has been stabilized after the light measurement switch is closed, the release switch is closed so as to start taking a picture.

That is, it is possible to constitute a light measuring circuit capable of making response to the abrupt alteration of the amount of the incident light by using a silicon photo-cell with quick photo-response characteristics as the light sensing element, whereby it takes a little time for the light measuring circuit to be stabilized, due to the stray capacity of the light sensing element, the amplifiers, the logarithmically compressing element and so on constituting the light measuring circuit. Further, a light sensing element with a quick photo-response characteristic is used, so that it is necessary to provide a low frequency band filter in order to eliminate the alteration in the light measurement output when the light source for illuminating the object contains a flicker, whereby the output of the light measuring circuit assumes the stabilized state after a certain time after the power source switch is closed because of the time delay in the low frequency band filter. Hereby, the time delay due to the afore-mentioned stray capacity is determined by the time during which the charge stored in the stray capacity is compensated by the photo-current of the light sensing element, whereby in the case of the small amount of the incident light, the produced photo-current is also small so that it takes a long time to reach the stabilized state while in the case of the large amount of the incident light it takes only a short time to reach the stabilized state. In the case of the afore mentioned time delay, the release button can be operated at a normal speed, while an abrupt operation of the shutter release button often leads to a misoperation.

Further, when the camera is used with a motor drive device or a remote control device it is always necessary to carry out the light measurement and the shutter release with a certain time difference in order to avoid improper exposure due to the afore-mentioned response delay of the light measuring circuit, for which the circuit construction becomes much complicated.

When a means for a certain amount of time delay is provided in order to avoid improper exposure due to the response delay of the light measuring circuit, particularly to cover a large time delay in the case of a dark object, the time difference for the shutter opportunity due to this operation delay becomes larger in the case of the bright object, whereby the number of pictures to be taken per second can not be increased during continuous photographing by means of a motor drive device.

Hereby, the time between the start of the current supply to the light measuring circuit and the stabilization of the circuit mainly depends upon the stray capacity of the light sensing element (SPC) and the logarithmically compressing element and the rising up time of the amplifier at the transient time and, further, the time delay due to the time constant of the low frequency band filter for eliminating the fluctuation of the light measurement output due to the flicker of the light source for illuminating the object when the photo-sensing characteristics of the light sensing element (SPC) is quick.

FIELD OF THE INVENTION

A first purpose of the present invention is to provide a camera which is so designed that a normal relation between the release operation and the operation of the camera can be obtained in the operation process of the camera by means of the release operation.

The present invention is particularly intended to provide a camera having an exposure control device for carrying out the light measurement, the exposure condition determination and the photographing operation by means of the release means including the electromagnetic element controlled by means of a plural number of the switches to be successively operated with the release operation, being characterized in that the improper operation due to the difference of the release operation condition for controlling the losing of the switches can be excluded.

The present invention is further intended to provide a camera which is so designed that an exact release operation can be carried out even when the amount of the incident light to be measured by means of the light measuring circuit actuated with the release operation fluctuates.

The present invention is further intended to provide a camera which is so designed that an exact exposure control can be obtained by means of a switch group to be operated with the release operation in a way of time sequence even when the amount of the light incident on the light measuring circuit is so small that it takes a long time for the light measuring circuit to produce the output.

The present invention is further intended to provide a camera which is so designed that the release operation of the camera is locked and the alarm is displayed when the condition of the release operation does not match with the light measuring operation and the subsequent operations of the camera.

DETAILED DESCRIPTION OF THE INVENTION

Figure 1:
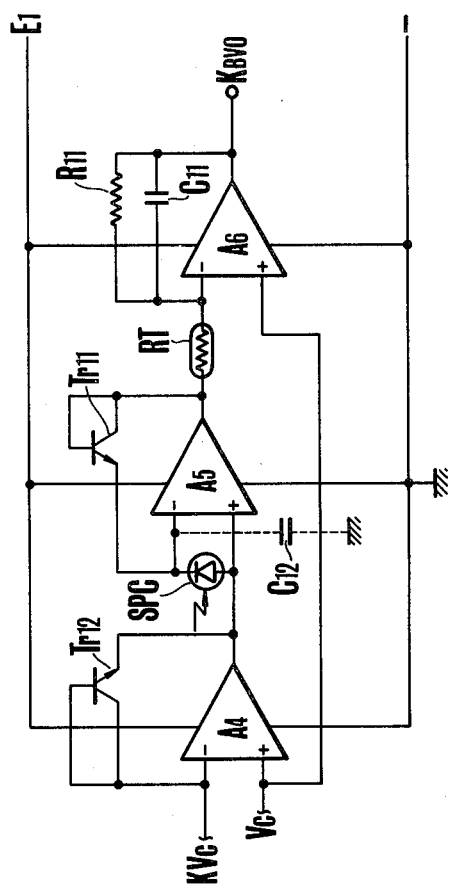
FIG. 1 shows a diagram of the light measuring circuit of the camera in accordance with the present invention.

FIG. 1 shows a circuit diagram of an embodiment of the light measuring circuit of the camera in accordance with the present invention. In the drawing, SPC is a light sensing element consisting of for example, a silicon photo-cell with a quick light response characteristics. $A_5$ is an operational amplifier whose feedback circuit includes a transistor $Tr_{11}$ (diode connection) with logarithmic characteristics, for logarithmically compressing the voltage of the SPC connected between the input terminals. $A_4$ is an operational amplifier whose feedback circuit includes a transistor $Tr_{12}$ with the same characteristic as that of the transistor $Tr_{11}$, for serving as a temperature compensating circuit. [Hereby, FIG. 1 corresponds to the L block of FIG. 2 to be explained later, while the information is supplied to the operation amplifier of the next step ($A_2$ in the W block of FIG. 2)]. Further RT is a temperature sensing resistance element, for compensating the temperature of the aforementioned light sensing element. $A_6$ is an operational amplifier whose feedback circuit includes a resistance $R_{11}$ and a condenser $C_{11}$ connected in parallel with each other, for acting as a low frequency band filter for interrupting higher harmonics of the light measurement output. $C_{12}$ connected in a dotted line between the inverting input terminal of $A_5$ and ground represents stray capacity which takes place necessarily during the manufacturing process of the circuit elements.

Below, the operation of the circuit shown in FIG. 1 will be explained. Generally, an operational amplifier used in such a circuit as is shown in the drawing needs a high input impedance so that the input step consists of a field effect type (FET) transistor while the output step consists of a bipolar transistor. Generally, a bipolar transistor is superior to an FET transistor in transient response characteristics so that, when an operational amplifier is connected to the power source, the bipolar step is brought into an operative state a little earlier than the FET step. That is, when the power source $E_1$ is connected to the circuit shown in FIG. 1 through the main switch, not shown in the drawing, in the initial state the output step (the bipolar step) of the operational amplifier is brought into an operative state earlier than the input state (the FET step) so that the current is feedback through $Tr_{11}$ in the feed back circuit in such a manner than an abnormal charge is stored in the stray capacitor $C_{12}$ in the input circuit. When, a little later, the input step (the FET transistor step) is brought into an operative state, because the potential at the inverting input side of the amplifier $A_5$ is higher than that at the non-inverting input side the output step of $A_5$ is brought into the switched off state in such a manner that the output voltage of $A_5$ becomes the low saturation level (logic level "0"). In this state, both the transistor $Tr_{11}$ and the light sensing element SPC are invertedly connected to the charge stored in $C_{12}$, so that the charge in $C_{12}$ can not be discharged through $Tr_{11}$ and SPC but is discharged by means of the photo-current produced by SPC. Consequently, it takes a considerable time for the abnormal charge in $C_{12}$ to be discharged. Especially when the amount of the light incident to SPC is small, namely at the light measurement of an object with low brightness, the photo-current is small so that the discharging time of the charge in $C_{12}$ can not be disregarded.

The output voltage of the operational amplifier $A_5$ varies in accordance with the eventual alteration of the characteristic of the compressing transistor $Tr_{11}$ due to the temperature. In order to compensate the alteration of this output voltage, the output of the operational amplifier $A_4$ whose feedback circuit includes the temperature compensation transistor $Tr_{12}$ with the same characteristics of the compressing transistor $Tr_{11}$ is applied to the non-inverting input terminal of $A_5$. Further, as to the alteration of the photo-current of the light sensing element SPC due to the temperature, the temperature sensing resistance element RT having a positive temperature coefficient is connected in series with the output circuit of $A_5$ so as to compensate the alteration of the output of the light measuring circuit due to the temperature. In the circuit shown in FIG. 1, a photoelectric element SPC with quick light response characteristics is used as a light sensing element, so that the light measurement output alters in accordance with the quick alteration of the amount of the incident light. Thus, when a light source having a flicker such as a fluorescent lamp is used for illuminating the object to be photographed, the alteration of the amount of the incident light due to flicker is mixed into the output of $A_5$ as flicker noise, which is inconvenient. In order to eliminate this flicker noise, the low frequency band filter consisting of an operational amplifier $A_6$, whose feedback circuit includes a resistance $R_{11}$ and a condenser $C_{11}$ connected imparallel with each other, is provided. By properly choosing the time constant of the circuit consisting of the resistance $R_{11}$ and the condenser $C_{11}$ in the feedback circuit the AC component included in the output of $A_5$ is reduced as to obtain a light measurement output free from flicker noise at the output of $A_6$. However, the operational amplifier $A_6$ has the delay characteristics as a low frequency band filter so that the output $A_6$ has a time lag against the rising up of the output of $A_5$ and therefore it is necessary to provide a counter measure against the misoperation of the camera due to this time lag.

The camera in accordance with the present invention presents circuits for compensating the above mentioned time lag as well as the alteration of the output due to the temperature alteration.

Figure 2:
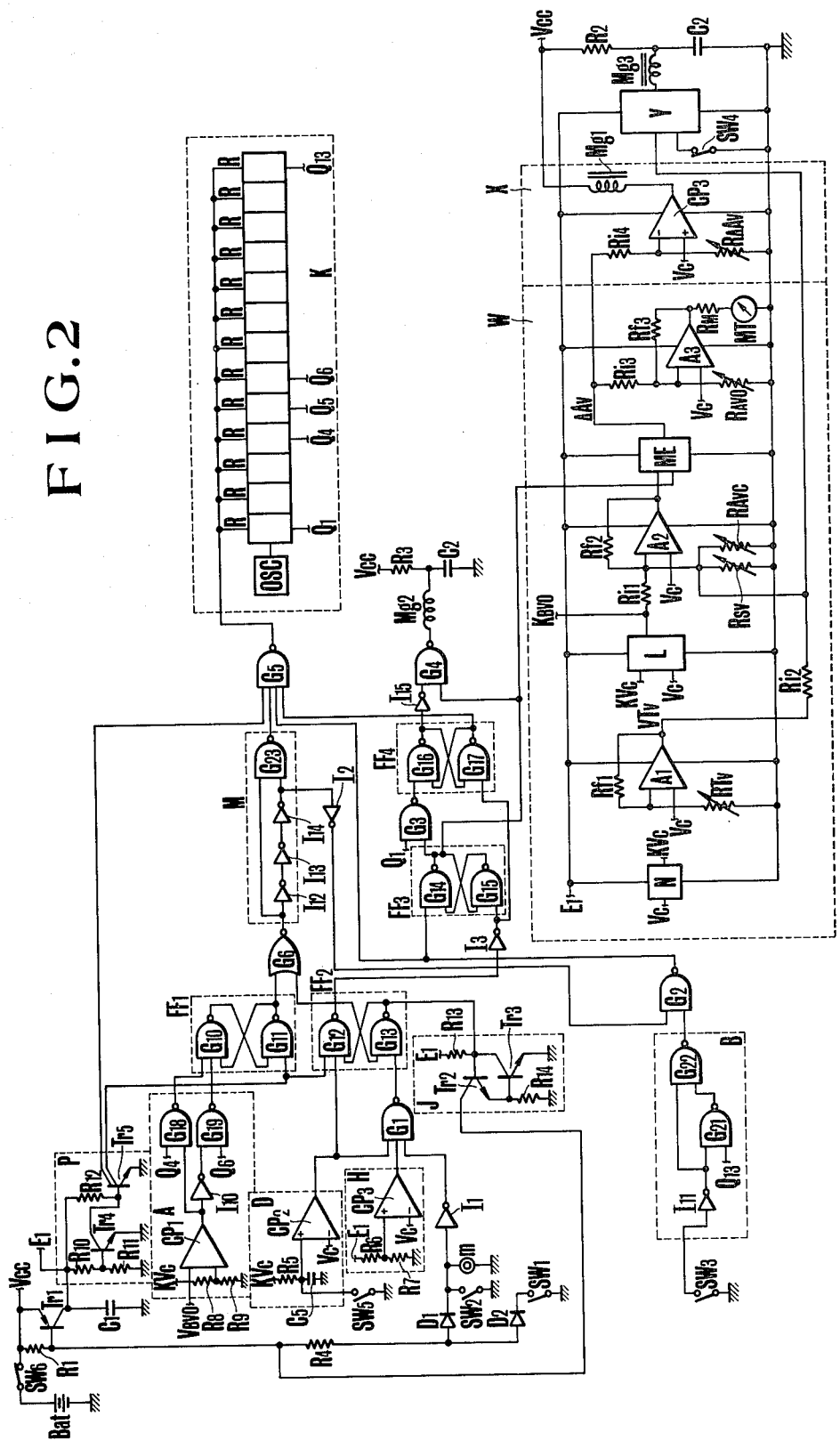
FIG. 2 shows a circuit diagram of the camera having a release control device in accordance with the present invention.

FIG. 2 shows a circuit diagram of an embodiment of the camera in accordance with the present invention. In the drawing, P is the pulse signal producing circuit for producing a short negative pulse at the output terminal when the light measurement switch SW is closed. Namely, when the transistor $Tr_1$ for controlling the power source becomes conductive and the voltage of the charged condenser $C_1$ becomes higher than a certain determined value, the transistor $Tr_2$ in the circuit P is closed while the transistor $Tr_3$ is opened. Thus, during a short time during which $Tr_3$ is closed after the light measurement switch $SW_1$ has been closed, a negative pulse is produced at the output terminal of the circuit P. The block A is a delay circuit for controlling the output of the signal from the light measuring circuit consisting of a comparator $CP_1$ for comparing the input signal $V_{BVO}$ from the light measuring circuit with the standard voltage from the standard signal producing circuit to be explained later, an inverter $I_{10}$ and NAND gates $G_{18}$ and $G_{19}$, being intended to delay the release signal in accordance with the response time by means of the value of the signal $V_{BVO}$ from the light measuring circuit. The block B is the self timer set circuit block for setting the self-timer when the switch $SW_3$ is closed, consisting of an inverter $I_{11}$ and NAND gates $G_{21}$ and $G_{22}$. The block D is the delay circuit for delaying the time from the winding up completion till the film plane is stabilized. $R_5$ and $C_5$ are the resistance and the condenser of the delay time constant circuit, while $CP_2$ is the comparator. H is the battery check circuit block presenting a comparator $CP_3$ for comparing the voltage $E_1$ of the power source with the standard voltage Vc in such a manner that, when the power source voltage is sufficiently high, the output of $CP_3$ becomes high level (Logic "1"). J is the constant current circuit for controlling the power source control transistor $Tr_1$. K is the sequence control counter block, OSC the clock pulse generator, R the reset terminal, and $Q_1$–$Q_{13}$ the outputs of the counters. M is the delay circuit consisting of inverters $I_{12}$, $I_{13}$ and $I_{14}$ and a NAND gate $G_{23}$ being intended to delay the signal from the NOR gate $G_6$ by the inverting time of the inverter so as to be produced from the NAND gate $G_{23}$ and supplied to the reset terminal of the counter K through the NAND gate $G_5$. $FF_1$ is the flip-flop for latching the light measurement completion signal from the block A while $FF_2$ is the flip-flop for latching the winding up completion signal from the block D, the power source voltage signal from the block H and the signal from the release switch $SW_2$ through the NAND gate $G_1$. The NOR gate $G_6$ serves to deliver the output "1" to the delay circuit block M of the next step and to the NAND gate $G_2$ through the inverters $I_{12}$, $I_{13}$, $I_{14}$ and $I_2$, when $FF_1$ and $FF_2$ are set. NAND gate $G_2$ delivers the low level output (Logic "0") to the flip-flop $FF_3$ so as to be latched there when the output from $I_2$ and that from the self-timer block B are "1". NAND gate $G_3$ delivers "0" so as to set the flip-flop $FF_4$ when the output $FF_3$ and the output $Q_1$ of the counter K are "1". $G_4$ is the NAND gate for driving the release magnet $Mg_2$ and produces the output "0" when the flip-flop $FF_3$ produces "1", $FF_4$ "0" and the inverter $I_{15}$ "1", in such a manner that the charge stored in the condenser $C_2$ through $R_3$ flows through the magnet $Mg_2$ so as to carry out the release operation. $G_5$ is the NAND gate, whereby when the output is "1", a reset signal is input to the counter K. Hereby, $SW_1$ is the light measurement switch, $SW_2$ the release switch, $SW_3$ the self-timer switch, $SW_6$ the power source switch and $SW_5$ the winding up completion switch, whereby $SW_5$ is opened at the winding up completion. Further, $Tr_1$ is a transistor. P is the block for producing the light measurement start pulse, which is so designed that when $Tr_1$ is brought into the switched on state at the start of the light measurement, the condenser $C_1$ starts to be charged in such a manner that before the potential reaches a certain determined value, $Tr_5$ and $Tr_4$ are successively brought into the switched on state and then $Tr_5$ is closed while $Tr_4$ is opened and, after the lapse of a certain determined time, $Tr_5$ is opened while $Tr_4$ is closed, whereby a pulse signal is produced and delivered to the NAND gate $G_5$, $FF_1$ and $FF_2$. Further, parallel to the release switch $SW_2$, a terminal M is provided so as to be applied with a signal from a remote control device.

W is a block for the light measurement, the calculation, the memory display and the constant voltage circuit, whereby L is a light measuring circuit including a light sensing element (not shown in the drawing) while $A_1$ and $A_2$ are the operational amplifier, whereby the photographing informations such as the shutter time, the film sensitivity the vignetting compensation of lens are set at the variable resistances RTv, RSv and RAvc so as to carry out the photographic calculation. Hereby $Rf_1$ and $Rf_2$ are the feed back resistance. ME is a memory circuit for storing the calculation result produced at the output of the operational amplifier $A_2$. Namely ME produces an aperture step number information ΔAv, which information is calculated with the smallest aperture value information F set at $R_{AVO}$ in the display operational amplifier $A_3$ in such a manner that the aperture value is displayed by means of a meter MT connected to the output of the amplifier $A_3$. X is the aperture control circuit so designed that the output ΔAv from the light measurement calculation circuit is compared with the signal RΔAv from a resistance operatively engaged with the diaphragm by means of the comparator. This is done in such a manner that, when both outputs are equal to each other, the aperture control magnet $Mg_1$ is controlled by means of the output signal from $CP_3$ so as to determine the aperture value, Y is the time control which is so designed that the shutter time control magnet $Mg_3$ is controlled by means of the signal from the timing buffer amplifier $A_1$ so as to close the shutter. Hereby, the charge stored in the condenser $C_2$ through the resistance $R_2$ is to flow through $Mg_3$. $SW_4$ is the time count switch to be opened at the start of the leading curtain of the focal plane shutter. N is a conventional standard signal producing circuit block.

Figure 3:
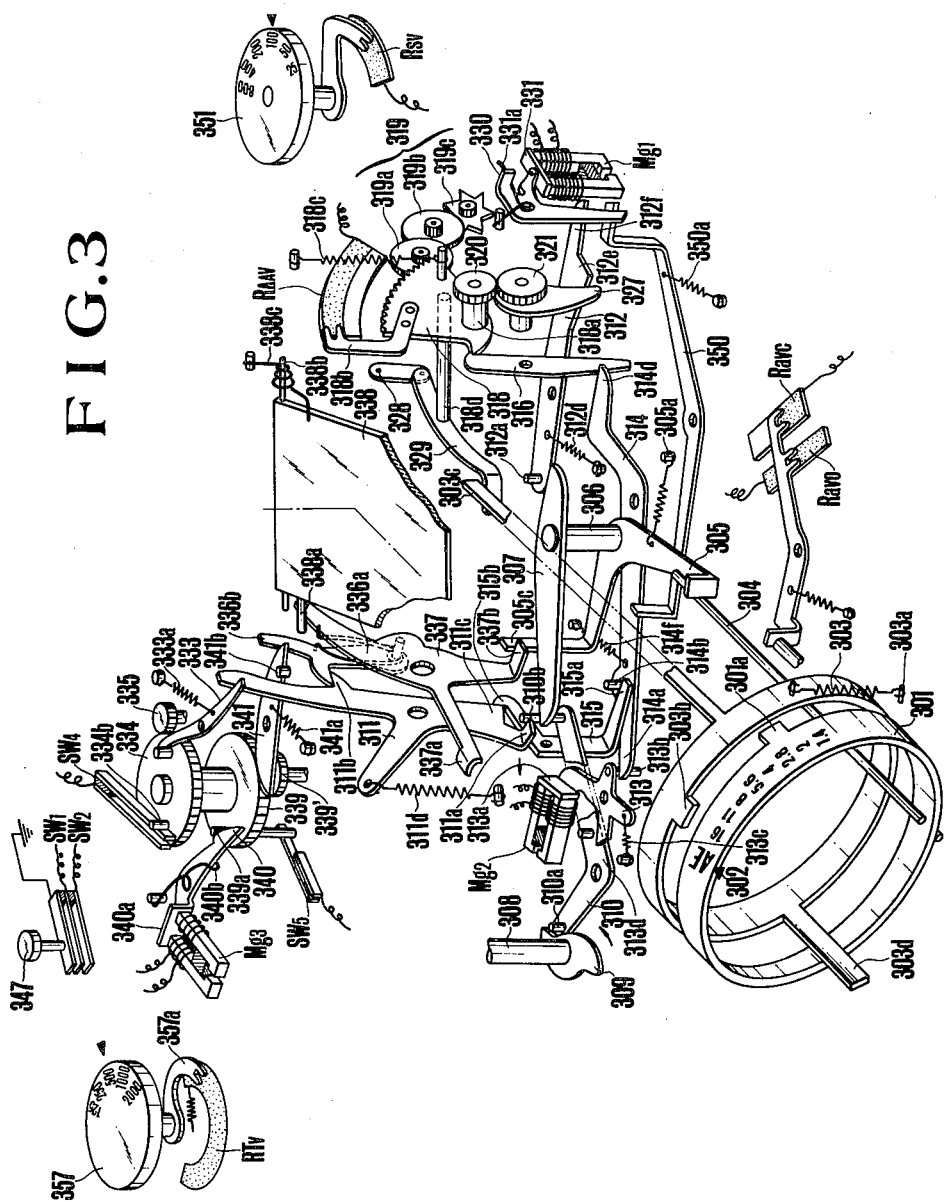
FIG. 3 shows important components of the camera in accordance with the present invention in perspective view, whereby the components are set apart.

FIG. 3 shows important components of the camera in accordance with the present invention in perspective view, whereby the components are set apart.

In the drawing, 301 is the aperture value setting ring, on which the automatic aperture value setting index AE and the manual aperture value setting index are provided.

302 is the index for making the automatic aperture value setting index AE coincide with the manual aperture value setting index. 303 is the aperture value preset ring, being urged along the clockwise direction by means of a spring 303a and presenting a projection 303b engageable with the projection 301a of the above mentioned aperture value setting ring 301. Further, the aperture value preset ring 303 is provided with an arm 303c while the aperture value preset ring 303 serves to determine the rotation amount of the bell crank by means of the lever 303d provided on the ring 303 through an aperture value set cam ring not shown in the drawing, whereby the bell crank serves to control the rotation of the diaphragm driving ring, not shown in the drawing, so as to determine the opening degree of the diaphragm.

304 is a pin provided on the above mentioned diaphragm driving ring, the end of which pin is engaged with the automatic aperture value setting lever 305 being urged along the counter-clockwise direction by means of a spring 303a. This automatic aperture value setting lever 305 presents a rising up part 305c. Further, on the same shaft 306 as that of the automatic aperture value setting lever 305, an intermediary lever 307 is provided independently of the automatic aperture value setting lever 305. 308 is the winding up shaft of the winding up lever, not shown in the drawing, whereby a winding up cam 309 is fixed at the end plane of the winding up shaft 308. 310 is a rotatable intermediary lever, whereby the pin 310a provided at the one end of this intermediary lever 310 engages with the winding up cam 309. Further, at the other end of the intermediary lever 310, a pin 310b is provided, being engaged with the other hand of the above mentioned intermediary lever 307 and at the same time with the one end 311a of the mirror driving lever 311. Further, the first holding lever 313 is charged by means of the pin 310c provided on the intermediary lever 310. Further, the pin 312a provided at the one end of the rotatable charge lever 312 is engageable with the other end of this intermediary lever 307. This charge lever 312 is urged along the counter-clockwise direction by means of a spring 312d.

$Mg_2$ is the first holding magnet with a permanent magnet engaged with the one end 313a of the first holding lever 313, whereby the pin 313b provided at the other end is engaged with the one end 314a of the release lever 314. The lever 313 is urged along the clockwise direction by means of a spring 313c. Further, when the lever 310 is rotated along the clockwise direction, the pin 310c rotates the lever 313 against the strength of the spring 313c along the counter-clockwise direction by means of the one end 313d of the lever 313. At the one end of the release lever 314, a pin 314b is provided, while by means of this pin 314b the other end 315a of the mirror driving engagement lever 315, whose one end 315a is engaged with the one side 311c of the above mentioned mirror driving lever 311, is held. Further, by means of the end 314d of the release lever 313, the one end of the rotatable AE holding lever 316 is kept. Further, this release lever is urged along the clockwise direction by means of a spring 314f. Hereby, the spring 314f is designed to be weaker than the spring 313c in strength. 318 is the AE sector gear, being kept by the other end of the above mentioned holding lever 316.

With this sector gear 318, the gears 319a, 319b and the stop wheel 319c constituting the speed adjusting mechanism 319 are engaged. Further, the sector gear 318 is provided with the slide piece 318b of the variable resistance RΔAv for determining the aperture preset value.

On the shaft 318a of the sector gear 318, a gear 320 is provided so as to be engaged with the AE charge gear 321. On the shaft of the gear 321, a lever 327 is fixed so as to be in contact with the other end 312e of the charge lever 312. On the above mentioned sector gear 318, a pin 318d is provided, whereby the end plane of this pin 318d is fixed at the signal lever 329 linked on the support lever 328. The arm 303c of the above mentioned aperture value preset ring 303 is kept by means of the bent end of the signal lever 329. The above mentioned AE sector gear 318 is strongly urged by means of the spring 303a along the clockwise direction against the spring 318c urged along the counter-clockwise direction on the sector gear 318. $Mg_1$ is the diaphragm control magnet which does not have magnetic attraction without current. The afore-mentioned magnet $Mg_2$ and the magnet $Mg_3$ are the magnets with a permanent magnet so designed that when they are supplied with current, the magnetic force acts in the reveral direction to that of the permanent magnet in such a manner that the magnet presents no attractive force as a whole. Consequently, in the state in which the magnet $Mg_1$ is not supplied with current, it is kept by means of the Mg holding lever 350 urged by means of the spring 350a. This attracting lever 330 is urged along the counter-clockwise direction by means of the spring 331a, whereby the bent end of the lever 330 is engageable with the stop wheel 319c of the afore-mentioned speed control mechanism 319. Further, with the other end of the attracting lever 330, the other stepped end 312f of the charge lever 312 is in contact.

The afore-mentioned mirror driving lever 311 has a delay device not shown in the drawing, being urged in the counter-clockwise direction by means of a spring 311d, whereby the one end is kept by the other end 315b of the afore-mentioned mirror driving engagement lever 315, while the other end is provided at a position at which the end is engageable with the one end of the leading curtain holding lever 335. This leading curtain holding lever 333 is urged in the counter-clockwise direction by means of the spring 333a, whereby the end is engaged with a pin 334a provided on the leading curtain gear 334. Further on the leading curtain gear 334, a pin 334b is provided so as to be in contact engagement with the count start switch SW4. This leading curtain gear 334 is engaged with the leading curtain pinion 335 of the leading curtain drum, not shown in the drawing. Further, at the holding part 311b of the afore-mentioned mirror driving lever 311, the mirror holding lever 336 is kept. This holding lever 336 is urged in the counter-clockwise direction by means of the spring 336a provided between the lever 336 and the mirror driving lever 311, whereby the one end is engaged with the push up lever 337 provided on the same shaft as that of the mirror driving lever 311. The one end 337a of the push up lever 337 is rotated in the clockwise direction by means of the mirror lift up operation from outside, not shown in the drawing, so as to lift up the mirror independently. The other end of this push up lever 337 holds the spring up pin 338a provided on the mirror 338.

This mirror can rotate around the mirror shaft 338b as center.

338c is the mirror returning spring. 339 is the tail curtain gear provided coaxially with the afore-mentioned leading curtain gear 334, being engaged with the tail curtain pinion 339' for the tail curtain drum, not shown in the drawing. Further, on the tail curtain gear 339, a pin 339a is provided. 340 is the attracting lever to be rotated by means of the afore-mentioned pin 339a, being so designed that the iron piece 340a of the lever 340 is attracted by means of the shutter control magnet with a permanent magnet Mg3. This attracting lever 340 is normally urged by means of the spring so as to be kept at the magnet Mg3. 341 is the tail curtain signal lever to be rotated by means of the spring 339a, being normally urged by means of the spring 341a, so as to be kept at the holding pin 341b. The end 336b of the afore-mentioned mirror holding lever 336 is kept by means of the afore-mentioned tail signal lever 341. 347 is the shutter button, by means of whose first stroke the light measurement switch SW1 is closed and by means of whose second stroke the release switch SW2 is closed.

351 is the ASA dial while Rsv is a variable resistance in which the film sensitivity value is input.

Below, the operation of the camera in accordance with the present invention will be explained in accordance with FIGS. 2 and 3. When at first the power source switch SW6 is closed and the film winding up is completed, the switch SW5 is opened, while the condenser C5 is charged through the resistance R5 of the block D in such a manner that, after lapse of a certain determined time, the comparator CP2 produces a high level output (Logic "1"). When then the release button 347 is pushed down so as to close the light measurement SW1, the transistor Tr1 becomes conductive so as to start to supply current to the circuit. At the same time, the transistor Tr5 of the block D is brought into the switched on state so as to produce a low level output (Logic "0"). This "0" output is input in the NAND gate G5, which produces the "1" output so as to reset the counter of the block K. Further, the "0" output of Tr5 is supplied to the one input terminal of the NAND gates G11 and G12 of the flip-flops FF1 and FF2, so as to reset the flip-flops FF1 and FF2. The flip-flop FF2 having been reset, the NAND gate G12 produces the "1" output in such a manner that the "0" output is supplied to the flip-flops FF3 and FF4 through the inverter I3 so as to reset the flip-flops FF3 and FF4. When subsequently the potential of the condenser C1 connected to the collecter of Tr1 rises, the transistor Tr4 of the block P is brought into the switched on state so as to open the transistor Tr5.

In the above mentioned state, E1 is supplied to the circuit block W from the power source, whereby the light measuring circuit L produces a signal Bvo corresponding to the brightness of the object to be photographed by means of the signal from the light sensing element shown in FIG. 1. Hereby Bvo is a signal represented by (Bv−Avo−Avc), whereby Bv is the APEX value of the brightness, Avo the smallest aperture value information F of the lens and Avc the vignetting compensation information. This Bvo, the Tv information set at the shutter time setting resistance RTv, the Sv information set at the film sensitivity setting resistance Rcv and the Avc information set at the vignetting compensation setting resistance RAvc are supplied to the operational amplifier A2 so as to be processed there. Namely, the afore-mentioned brightness information Bv and the photographing informations Tv, Sv and Avoc are processed in such a manner that A2 produces the number ΔAv (=Av−Avo) of the steps of the aperture value from the smallest aperture value F.

This ΔAv is represented as follows:

$$\Delta Av = Av - Avo = (Bv - Avo - Avc) + Sv - Tv + Avo$$

The term (Bv−Avo−Avc) in the above equation is Bvo, the output signal of the light sensing element in the case of the TTL light measurement. The output of the amplifier A2 is stored in the memory circuit ME.

The time during which the output of the light measuring circuit L is stabilized is different in accordance with the amount of the light incident upon the light sensing element. The output VBvo of the L in the W block is input in the comparator CP1 in the A block so as to be compared with the standard voltage. When the amount of the incident light is small at this time, CP1 produces a "0" output. Thus, a "0" output is input in the NAND gate G18, which produces a "1" output as before, while the NAND gate G19 in which the "1" signal is input through the inverter I10 produces a "0" output with the Q6 output of the counter K, so as to set the flip-flop FF1. Further, when the amount of the light incident upon the light sensing element is large, the comparator CP1 produces the "1" output so that a "0" signal is input to the NAND gate G19, which produces a "1" output to be input in the NAND gate G18 in such a manner that with the Q4 output of the counter K, the NAND gate G18 produces a "0" output so as to set the flip-flop FF1. Namely, when the light incident upon the light sensing element is dark, the setting of $FF_1$ is delayed by the time from the reset step count start by means of the counter until the appearance of the $Q_6$ output, while when the incident light is bright, the setting of $FF_1$ is delayed by the time from the count start until the appearance of the $Q_4$ output. If the time from the resetting of the counter K after the closing of the transistor $Tr_1$ until the appearance of the $Q_4$ output of "1" after the counting of the clock pulses and the time from the resetting of the counter K until the appearance of the $Q_6$ output "1" are chosen as the time during which the output of the light measurement is stabilized, a longer delay time can be obtained for a dark object while a shorter delay time can be obtained for a bright object.

Then the release switch $SW_2$ is closed with the second stroke of the release button 347, whereby the inverter $I_1$ produces the "1" output to be input to the one input terminal of the NAND gate $G_1$. If at this time, a certain determined time has elapsed since the film has been wound up and the switch $SW_5$ has been opened, the comparator $CP_2$ produces a "1" output to be input to the NAND gate $G_1$. Further, when the power source voltage is in an operable range of the device, a "1" output is produced also from the block H. When the release switch $SW_2$ is closed in this state, the NAND gate $G_1$ produces a "0" output so as to set the flip-flop $FF_2$. When the flip-flop $FF_2$ is set, the conductive state of the transistor $Tr_1$ is maintained through the constant current source J. $FF_2$ is latched even when the release switch $SW_2$ is brought in the switched off state; thus, the current supply to the circuit is maintained. The above discusses the operation of the circuit by means of the release button. When the release button is pushed down at a normal operation speed, there is a sufficient time since the light measuring switch $SW_1$ is closed until the release switch $SW_2$ is closed so that the flip-flop $FF_1$ is set through the afore-mentioned process after the light measurement switch $SW_1$. After that, $FF_2$ is set with the closing of the release switch $SW_2$, whereby the NOR gate $G_6$ produces a "1" output.

When, on the other hand, the release button is pushed down rapidly, the release switch $SW_2$ is closed immediately after the light measurement switch $SW_1$ is closed so that the flip-flop $FF_2$ is set earlier when the switch $SW_2$ is closed. Then the flip-flop $FF_1$ is set after the lapse of a certain time determined in accordance with the brightness of the object, when the NOR gate $G_6$ produce a "1" output. That is, when the release button is pushed down at a normal speed, the NOR gate $G_6$ is opened immediately after the release switch $SW_2$ is closed, while, when the release button is pushed down rapidly the NOR gate $G_6$ is opened after the lapse of a time during which the light measuring circuit is stabilized (variable in accordance with the brightness of the object) so that the normal sequential operation can always be carried out regardless of the operation speed of the release button.

Further, when a remote control device is applied to a camera, the light measurement switch $SW_1$ is not used, whereby a signal is supplied to the remote terminal m from the remote control device so as to substitute the efficiency of the release switch $SW_2$ so that, in this case, the NOR gate $G_6$ is opened after the light measuring circuit is stabilized after the lapse of a certain determined time after the power source control transistor $Tr_1$ has become conductive.

When the NOR gate $G_6$ produces a "1" output the NAND gate $G_{23}$ of the block M produces a "0" output so as to reset the counter K through the NAND gate $G_5$. When then the delayed "0" signal is input in the NAND gate $G_{23}$ through the inverters $I_{12}$, $I_{13}$ and $I_{14}$, $G_{23}$ produces the "1" output again. Further, the "0" output of the inverter $I_{14}$ is input in the NAND gate $G_2$. When at this time, the self-timer is not used, $SW_3$ is opened so that a "0" output is input in the one input terminal of the NAND gate $G_{22}$ of the block B while a "0" output is input in the one input terminal of the NAND gate $G_{21}$, which produces a "1" output, whereby $G_{22}$ produces a "1" output in such a manner that the NAND gate $G_2$ produces a "0" output. When the self-timer is used, the switch $SW_3$ is closed, so that a "1" output is input in the NAND gate $G_{21}$ through the inverter $I_{11}$ so that the block B produces a "0" output and the NAND gate $G_2$ produces a "1" output, while when the $Q_{13}$ of the counter K produces a "1" output after lapse of a certain determined time of the self-timer the NAND gate $G_{21}$ produces a "0" output and the NAND gate $G_{22}$ produces a "1" output in such a manner that the NAND gate $G_2$ produces a "0" output. When the NAND gate $G_2$ produces a "0" output, the NAND gate $G_5$ produces a "1" output so that the counter K is reset for the third time while at the same time the flip-flop $FF_3$ is set so as to transfer a "1" output to the memory circuit ME of the light measuring block W in such a manner that the information of the number of the aperture step $\Delta Av$ after calculation is stored in ME. Further, when the "1" output of the flip-flop $FF_3$ is input in the NAND gate $G_4$, the gate $G_4$ produces a "0" output whereby the charge stored in the condenser $C_2$ through the resistance flows through the release magnet $Mg_2$. When then the $Q_1$ of the counter K produces a "1" output, the NAND gate $G_3$ produces a "0" output so as to set the flip-flop $FF_4$, whereby the counter K is reset by means of the output of $FF_4$ through the NAND gate $G_5$. Further, the "1" output of the flip-flop $FF_4$ is input in the NAND gate $G_4$ as a "0" output through the inverter $I_{15}$, whereby $G_4$ produces a "1" output so as to interrupt the current to the release magnet $Mg_2$. Thus, when the release button 347 is pushed down, the light measurement switch $SW_1$ and the release switch $SW_2$ are closed successively and then the release magnet $Mg_2$ is actuated so as to lose the first holding of the release operation. Namely, when the release magnet $Mg_2$ is excited, the first holding lever 313 shown in FIG. 3 is released so as to be rotated by means of a spring 313c. That is, by means of the pin 313b of the first holding lever 313, the one end 314a of the release lever 314 is rotated along the counter-clockwise direction against the strength of the spring 314f.

Thus, the mirror driving engagement lever 315 is rotated by means of the pin 314b, whereby the detail will be explained below. Further, along with the rotation of the release lever 314 along the counter-clockwise direction, the holding lever 316 is rotated along the counter-clockwise direction so as to be disengaged from the sector gear 318, whereby the holding lever 350 is rotated along the counter-clockwise direction together with the release lever 314 while, along with the rotation of the sector gear 318, the signal lever 329 is moved downwards through the pin 318d in such a manner that the aperture value preset ring 303 whose arm 303c is kept by this signal lever 329 induces the sector gear 318 to rotate along the clockwise direction by means of the spring 303a against the force of the spring 318c. Thus, the gears 319a, 319b and 319c constituting the speed adjusting mechanism 319 are rotated, whereby the stop-wheel in the last step is rotated along the counter-clockwise direction. Further, along with the rotation of the sector gear 318, the slide piece 318b of the variable resistance RΔAv is moved.

The output ΔAv of the memory circuit ME in FIG. 2 is compared with the set value of the resistance RΔAv in the comparator $OP_3$ in such a manner that when the output of the comparator $OP_3$ has reached a certain determined level, the current supply to $Mg_1$ is interrupted so as to free the iron piece 331. Thus, the attracting lever 330 is rotated along the counter-clockwise direction by means of the spring 331a, whereby the bent part of the lever 330 is engaged with the stop-wheel 319c so as to stop the rotation of the wheel 319c. The position of the sector gear 318 is determined in this way. Thus, when the sector gear 318 stops rotating as stated above, the aperture preset ring 303 has been rotated into a position corresponding to a proper aperture value so as to determine the position of the bell crank. In other words, the position at which the aperture value preset ring 303 has stopped corresponds to the aperture value determined with the information of the light sensing element PD for measuring the light through the photographing lens and various set informations such as the shutter time, the film sensitivity and the exposure compensation information. On the other hand, along with the start of the AE operation, the automatic diaphragm also starts to operate. Namely, the first holding lever 313 is rotated along the clockwise direction by means of the spring 313c and the release lever 314 is rotated in the counter-clockwise direction in such a manner that the end 315a of the mirror driving engagement lever 315 is rotated in the clockwise direction by means of the pin 314b. Namely, the one side 311c of the mirror driving lever 311 is disengaged from the one end 315b of the mirror driving engagement lever 315 so as to rotate the mirror driving lever 311 along the counter-clockwise direction by means of the spring 311d. At the same time, the push up lever 337 supporting the holding lever is rotated in the counter-clockwise direction because the claw part 311b of the mirror driving lever 311 is in the engaged state with the holding lever 336. Thus, the bent part 337b of the push up lever 337 is engaged with the rising up part 305c of the automatic diaphragm lever 305 so as to rotate the lever 305 along the clockwise direction. In this way, the pin 304 provided on the diaphragm driving ring is actuated so as to close the diaphragm in accordance with the position of the bell crank on which the aperture value is preset. Further, in with the rotation of the push up lever 337 along the counter-clockwise direction the spring up pin 338a of the mirror is pushed up so as to lift up the mirror 338.

Along with the lifting up motion of the mirror 338, the delay device, not shown in the drawing, is operated in such a manner that after the lapse of a time delayed by means of the delay device the leading curtain holding lever 333 is rotated in the clockwise direction by means of the afore-mentioned mirror lever 311. By means of the time delayed with this delay device, the shutter can be started after the lapse of a time during which the diaphragm is closed out of the totally opened state into the least opened state. Thus, the leading curtain gear 334 starts to rotate so as to allow the leading curtain through the leading curtain pinion. Along with the start of the leading curtain, the count start switch $SW_4$ is opened by means of a conventional method in such a manner that after the lapse of a time determined with the variable resistance RTv whose resistance value is set so as to correspond to the set shutter time, the control circuit Y is operated so as to apply a pulse to the exciting coil $Mg_3$. Thus the magnetic force of the permanent magnet is compensated by that of the magnet $Mg_3$ in such a manner the attracting force as a whole disappears. Thus, the locking of the tail curtain 339 by means of the attracting lever 340 is released in such a manner that the tail curtain gear 339 starts to run so as to allow the tail curtain to start to run through the tail curtain pinion. After the tail curtain has run, along with the rotation of the tail curtain gear 339, the tail curtain signal lever 341 is rotated along the counter-clockwise rotation by means of the pin 339a so as to rotate the mirror holding lever 336 in the clockwise direction. Along with the rotation of this mirror holding lever 336, the mirror driving lever 311 is disengaged. Thus, the push up lever 337 is rotated in the clockwise direction by means of a spring 305a through the automatic aperture value setting lever 305 so as to bring the mirror back into the initial position by means of the returning spring. Further, at the same time the automatic aperture value setting lever 305 is rotated in the counter-clockwise direction by means of the spring 305a in such a manner that the diaphragm resumes the initial totally-opened state due to the returning of the pin 304 provided on the diaphragm driving ring.

Further, along with the rotation of the tail curtain gear 339, the winding up completion switch $SW_5$ is closed, whereby the comparator $CP_2$ in the block D in FIG. 2 produces a "0" output so that the flip-flop $FF_2$ is reset. When $FF_2$ is reset, the flip-flops $FF_3$ and $FF_4$ are also reset. When the winding up motion is carried out by means of the winding up shaft 308 in this state, the film is wound up and the shutter is charged while, through the intermediary levers 310 and 307, the charge lever 312 is charged together with the automatic aperture value setting mechanism and the mirror mechanism. After the afore-mentioned release operation, the disengaged parts are again engaged so as to resume the state shown in FIG. 3.

When for example, the winding up motion is carried out by means of the automatic winding up mechanism while the release button is kept in the pushed down state, the time since the winding up completion switch $SW_5$ has been opened until the comparator $CP_2$ produces a "1" output corresponds to the time delay to be determined by the time constant of the resistance $R_5$ and the condenser $C_5$. This delay time is to be determined in accordance with the time during which the wound up film is stabilized while the switch is also stabilized from chattering in such a manner that even when the winding up operation is carried in the pushed down state of the release, the shutter can never be released under the influence of the above chattering and in the unstable state of film.

As explained above, when the shutter button is operated at the normal speed in the case of the a camera of electromagnetic actuating system in accordance with the present invention, the shutter is released immediately in the same way as in case of the conventional system. Further, even when the release button is operated abruptly, which can be considered as misoperation in the case of the conventional camera, the shutter is released only after the light measuring circuit has reached a stabilized state, which assumes a proper exposure.

Figure 4:
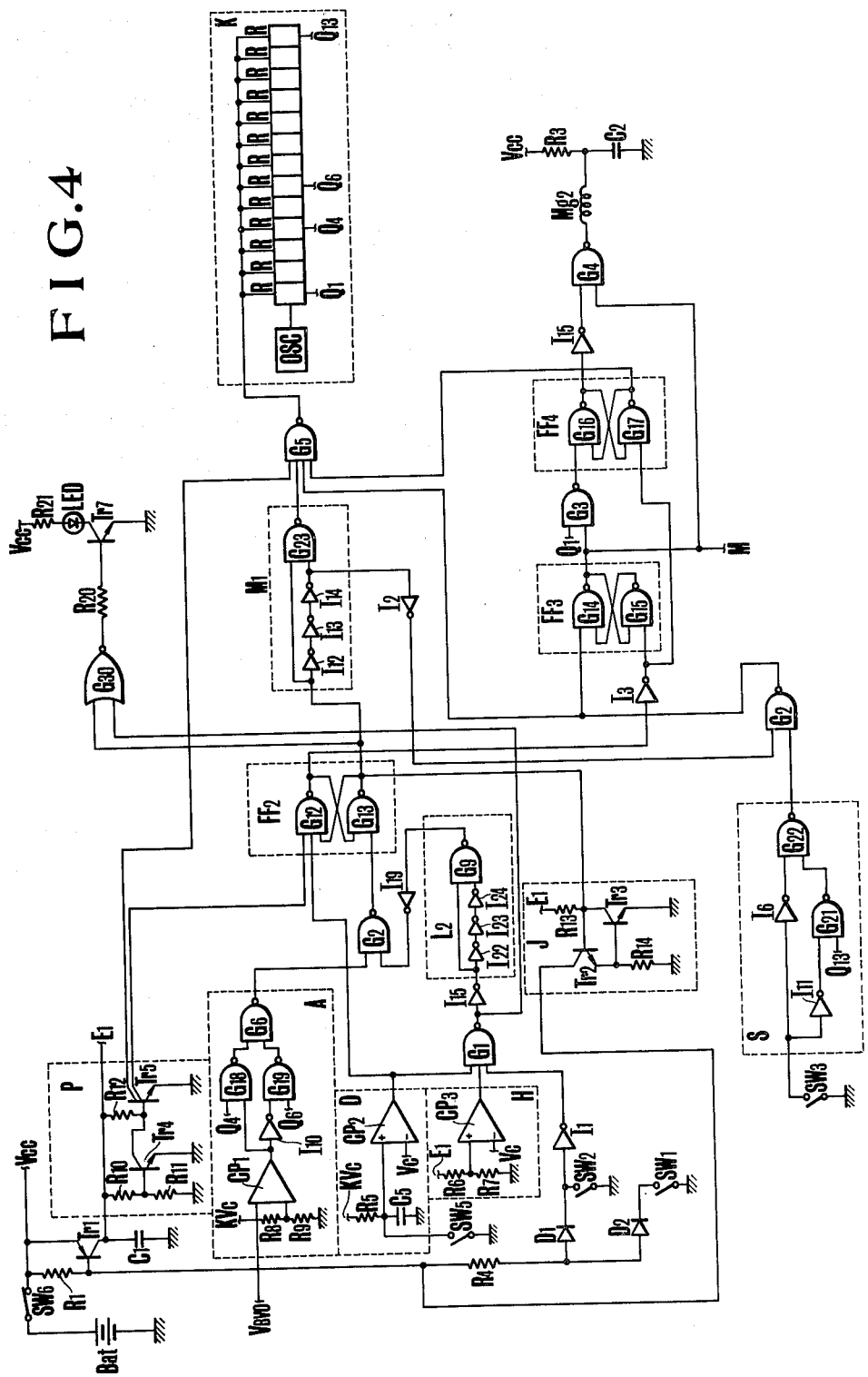
FIG. 4 shows the circuit of the alarm display of the camera having a release control device in accordance with the present invention.

The light measuring switch $SW_1$ and the release switch $SW_2$ in the afore mentioned embodiment in accordance with the present invention are closed in operative engagement with the first and the second stroke respectively of the shutter release button, whereby it goes without saying that the same effect can also be obtained even by means of switches, for example, provided at proper positions outside of camera. FIG. 4 shows a circuit diagram of the embodiment in accordance with the present invention, whereby the alarm for the locking of the release operation due to an abrupt handling is displayed.

The circuit elements, the circuit blocks and the logic circuits having the same figures as those shown in FIG. 1–FIG. 3 are the same elements, blocks and circuits.

$G_{30}$ is a NOR gate, which produces an output for controlling the transistor $Tr_7$ so as to actuate LED in order to display an alarm for the abnormal release operation.

In the circuit shown in FIG. 4, the power source $SW_6$ is closed so as to supply current to the circuit from the power source. When then the release button (not shown in the drawing) is pushed down, the light measuring switch $SW_1$ is closed with the first stroke. Thus, a current flows through the circuit $D_2$–$SW_1$, whereby the transistor $Tr_1$ is brought in the switched on state due to the voltage drop in the resistance $R_1$.

The condenser $C_1$ is charged with the output current of $Tr_1$, while the terminal voltage is applied to the circuit P. The transistor $Tr_4$ in the circuit P is brought in the closed state while the transistor $Tr_5$ is brought in the opened state so that the circuit P produces a logic output "0" by means of which output pulse "0" the NAND gate $G_5$ momentarily produces the "1" output, whereby "1" appears at the terminal R of the sequence counter K, while the counter is reset. Further, the "0" output of the circuit P is input in the one input of the NAND gate $G_{12}$ of the flip-flop $FF_2$ so as to reset the flip-flop $FF_2$. Then, the "1" output of the NAND gate $G_{12}$ is input in the flip-flop $FF_3$ as "0" input through the inverter $I_3$, so as to reset $FF_3$, whereby the flip-flop $FF_4$ is also reset by means of the "0" output of $I_3$. The thus reset counter K starts to count the pulses from the clock oscillator OSC. When at this time, the quantity of the light incident to the light sensing element is large, namely the object is bright, the input brightness $V_{Bvo}$ to the circuit is large, whereby the comparator $CP_1$ produces a "1" output. This "1" signal is directly input to the NAND gate $G_{18}$ as "1" signal but to the NAND gate $G_{19}$ as "0" signal through the inverter $I_{10}$. Namely, the NAND gate $G_{18}$ produces a "0" output when the counter delivers the "1" of $Q_4$, whereby the NAND gate $G_6$, namely the circuit A produces a "1" output after $Q_4$ has produced the output after the counting start of the counter K. Further, when the object is dark, the $CP_1$ produces a "0" output so that the circuit A produces a "1" output by means of the signal from the NAND gate $G_{19}$ when the counter produces the "1" $Q_6$ output. The "1" output of this circuit A, whose delay time is changed over by means of the amount of the sensed light, is input in the one input terminal of the NAND gate $G_2$.

The release switch $SW_2$ is closed with the second stroke of the release button after the light measuring switch $SW_1$ is closed. When at this time, the camera is in the wound up state and the film is in the stabilized state, the "1" output appears at the output terminal of the comparator $CP_2$ of the circuit D. Further, when the power source voltage is higher than a certain determined state, the circuit H also produces a "1" output. In such a state the "1" signal is input in the gate $G_1$ so that the gate $G_1$ produces a "0" output. The "0" output of the NAND gate $G_1$ is input in the pulse generating circuit $L_2$ as a "1" signal through the inverter $I_{15}$. Thus, a negative pulse signal is produced at the output terminal of $L_2$ and inverted into a positive pulse in the inverter $I_{19}$, so as to be input in the NAND gate $G_2$. At this time, the "1" output of the circuit A is input to the one input terminal of the NAND gate $G_2$ after the lapse of a delayed time corresponding to the brightness of the object in such a manner that $G_2$ produces a "0" output when the positive pulse is input to the NAND gate $G_2$ from the $L_2$.

Namely, when the signal and so on is input in the one input terminal of the NAND gate $G_2$ during the sufficient time between the closing of the light measuring switch $SW_1$ and that of the release switch $SW_2$, the NAND gate $G_2$ produces a "0", output to be input in $G_{13}$ of the flip-flop $FF_2$ so as to set the flip-flop $FF_2$. However, when the release button is operated abruptly, the time between the closing of the light measuring switch $SW_1$ and that of the release switch $SW_2$ becames short in such a manner that the circuit A does not produce the "1" signal when the positive pulse has reached the NAND gate $G_2$ from $L_2$. The NAND gate $G_2$ does not produce the "0" output in this state, so that the flip-flop $FF_2$ has not yet been set. Namely, the release operation to be started after $FF_2$ has been set can not be carried out, being brought in the locked state of the release. Further at this time, the NAND gate $G_1$ produces a "0" output, while the flip-flop $FF_2$ produces a "0" output so that the "0" signal is supplied to the two input terminals of the NOR gate $G_{30}$ in such a manner that the transistor $Tr_7$ is brought in the switched on state by means of the "1" output of $G_{30}$ so as to light up the LED in order to give the alarm that the release is in the locked state.

When the release button is pushed down at a normal speed, the flip-flop $FF_2$ is set by means of the output of the NAND gate $G_2$, whereby the "1" output of $FF_2$ is applied to the constant current circuit J, which supplies a constant current to the base circuit of the transistor $Tr_1$. In this way, the conductive state of the transistor $Tr_1$ is kept so that the current supply to the circuit after then is maintained even if the light measurement switch $SW_1$ is opened. At the same time, the "1" output produced at the setting of the flip-flop $FF_2$ is input in the pulse forming circuit $M_1$, which produces a negative pulse at the output terminal. The negative pulse is supplied to the counter K through the NAND gate $G_5$, so as to reset the counter K. Further, the "0" output of the inverter $I_{14}$ of the pulse forming circuit $M_1$ is input in the one input terminal of the NAND gate $G_2$ as a "1" output through the inverter $I_2$.

When at this time, the self-timer is not used and the self-timer switch $SW_3$ is opened, the NAND gate $G_{22}$ of the circuit S produces the "1" output while the "1" signal is supplied both inputs of the NAND gate $G_2$, which produces a "0" output, by means of which output, the counter K is reset through the NAND gate $G_5$ and the flip-flop $FF_3$ is set.

Further, when the self-timer is used and the timer switch $S_3$ is closed, the circuit S produces a "1" output after $Q_{13}$ has produced a "1" output after the counter was reset to start the counting of the clock, in such a manner that the NAND gate $G_2$ produces a "0" output.

Thus, at this time point, the counter is reset while the flip-flop $FF_2$ is set.

The flip-flop $FF_3$ is set when a "1" signal is supplied to one input of the NAND gate $G_4$ and, while the "1" signal is transmitted, the light measuring part shown in FIG. 2 is applied through the terminal M so as to store the light measurement value. Further, the set signal "1" of the flip-flop $FF_3$ is supplied to the NAND gate $G_4$, which produces a "0" output when the counter produces $Q_1$, whereby the flip-flop $FF_4$ is set. Further, the flip-flop $FF_4$ in the reset state delivers a "1" signal to the NAND gate $G_4$ through the inverter $I_{15}$ so that the "1" signal is supplied to the two input terminals of the NAND gate $G_4$. Thus, the charge stored in the condenser $C_2$ through the resistance $R_3$ runs through the magnet $Mg_2$ in a way of pulse so as to excite the magnet $Mg_2$. When the $Q_1$ output of the afore mentioned counter is input in the NAND gate $G_4$, so as to set the flip-flop $FF_4$, a current is supplied to this $Mg_2$ for a short time until the NAND gate $G_4$ is inverted. Thus, by means of the magnet, the electromagnet release operation is carried out in such a manner that the photographing operation after that is carried out as explained above. When, by means of the electromagnetic release, the mechanism in the camera (not shown in the drawing), has finished the photographing operation while the next winding up operation has been completed, the winding up completion switch $SW_5$ is closed. Further, the circuit D produces a "0" output whereby the flip-flop $FF_2$ is reset in such a manner that by means of the output of $FF_2$, the flip-flops $FF_3$ and $FF_4$ are reset so as to be brought back in the state before the release button is pushed down. Hereby with respect to the afore mentioned embodiment, a camera provided with the electromagnetic release device with a magnet is explained, whereby it goes without saying that the present invention need not to be limited to such a camera and the present invention can also be applied to the camera with the conventional release device.

As explained above, in the case of the camera provided with the release device in accordance with the present invention, the improper exposure control by means of the stored unstable light measurement value due to the abrupt operation of the release button, which improper exposure control is apt to take place in the case of the system in which the light measurement switch and the release switch in operative engagement with the operation of the release button are used, can be avoided, whereby the abnormal release operation of the release device is locked and the misoperation in taking a photograph is eliminated.

Further, although the stabilizing time of the light measuring circuit in the case of the bright object is different from that in the case of the dark object, the delay time is automatically changed over between the above two cases in accordance with the present invention in such a manner that there takes place no unnecessary time delay for the bright object. This is very advantageous, for example, for increasing the number of pictures per second in the case of continuous photographing by means of a motor drive device.

What is claimed is:
1. A camera comprising:
(a) actuating means for carrying out the actuating operation of a camera;
(b) a circuit for measuring the brightness of the object to be photographed, by means of the operation of the actuating means;
(c) an exposure control mechanism for carrying out the exposure control of the camera; and
(d) control means for controlling the time at which the actuating signal of the exposure control mechanism is produced, in accordance with the magnitude of the output signal of the light measuring circuit wherein the control means includes delay means for delaying the time at which the actuating signal of the exposure control mechanism is produced, in accordance with the magnitude of the output signal of the light measuring circuit.

2. A camera in accordance with claim 1, wherein the delay means includes selecting means for selectively delaying the time at which the actuating signal of the exposure mechanism is produced, in accordance with the magnitude of the output signal of the light measuring circuit.

3. A camera comprising:
(a) actuating means for carrying out the actuating operation of a camera;
(b) a circuit for measuring the brightness of the object to be photographed, by means of the operation of the actuating means;
(c) an exposure control mechanism for carrying out the exposure control of the camera;
(d) control means for controlling the drive of the exposure control mechanism; and
(e) delay means for producing the actuating signal for the control means, after the lapse of a time determined from the output signal of the light measuring circuit.

4. A camera in accordance with claim 3, wherein the delay means includes a selecting means for delaying the time at which the output of the control means is produced, in accordance with the magnitude of the output signal of the light measuring circuit.

5. A camera comprising:
(a) light measuring means for producing an electrical signal in accordance with the amount of the light incident from the object;
(b) an exposure control mechanism for controlling the exposure of the camera;
(c) operation means for carrying out the light measuring operation of the light measuring means;
(d) control means for controlling the operation of the exposure control mechanism by means of the operation of the operating means; and
(e) circuit means for producing an operation signal to be supplied to the control means, after lapse of a time determined in accordance with the output signal of the light measuring means.

6. A camera in accordance with claim 5, wherein the circuit means includes a selecting means for selectively delaying the time at which the output signal of the control means is produced, in accordance with the magnitude of the output signal of the light measuring means.

7. A camera comprising:
(a) release means including a first switch means and a second switch means;
(b) light measuring means for producing an electrical signal by means of the first switch means in accordance with the amount of the light coming from the object to be photographed;
(c) an exposure control mechanism for carrying out the exposure control of the camera;
(d) control circuit means for producing an actuating signal of the exposure control mechanism in accordance with the signal produced by means of the operation of the second switch means; and (e) delay means for controlling the delay of the time at which the actuating signal of the control signal is produced, in accordance with the length of the time needed from the operation of the first switch means up to the production of the output signal of the control means by means of the operation of the second switch means.

8. A camera in accordance with claim 7, wherein the delay means includes selecting means for selecting the delay time in accordance with the length of time needed.

9. A camera provided with a counter to be supplied with a current by means of the release operation so that, by means of the count signal of the counter, the release operation operates in a digital way having:

(a) light measuring means for sensing the light incident from the object to be photographed to produce an electrical signal in accordance with the amount of the incident light;

(b) release means having a first switch means which is operated by the first step of the release operation and a second switch means which is operated by the second step of the release operation; and (c) standard signal producing means for producing an electrical standard signal with the operation of the release operation, wherein control means for controlling the time at which the release signal is produced, comprises:

(1) delay means, said means being supplied with the signal from the light measuring means and the standard signal producing means to delay the time at which the output is produced, in accordance with the magnitude of the output signal of the light measuring means; and (2) release signal producing means, said means being supplied with the signal from the delay means and the shutter release means to produce the release signal of the camera in accordance with the delay signal of the delay means.

10. A camera which is sequentially controlled by means of the electrical signal produced in accordance with the release operation, having:

(a) a power source;
(b) diaphragm means;
(c) diaphragm control means;
(d) shutter means;
(e) calculating means for calculating the exposure amount in accordance with input information as to the photographing conditions;
(f) shutter control means for controlling the operation in accordance with the electrical signal; and
(g) counter means which includes a pulse oscillator and counts pulses derived from the pulse oscillator, comprising:

(1) shutter release means having first switch means which is operated by the first step of the shutter release operation and second switch means which is operated by the second step of the shutter release operation;

(2) light measuring means for producing an electrical signal corresponding to the amount of the incident light from the object to be photographed;

(3) standard signal producing means for producing an electrical standard signal;

(4) first delay means, said means being supplied with the signal of the standard signal producing means and the light measuring means to delay the time at which the output signal is produced, by means of the counting operation of the counter means in accordance with the magnitude of the light incident from the object to be photographed; and (5) release signal producing means, said means producing a release signal of the camera by means of the shutter release actuating signal from the shutter release means and the signal from the first delay means so as to control the operation of the diaphragm control means and the shutter control means.

11. A camera in accordance with claim 10, wherein the light measuring means includes converting means for converting the input signal of the incident light into an electrical signal and temperature compensating means for compensating the fluctuation of the output signal of the converting means due to change of temperature.

12. A camera in accordance with claim 10, wherein the light measuring means includes converting means for converting the input signal of the incident light into an electrical signal and filter means for interrupting the high frequency components in the light measuring output signal.

13. A camera in accordance with claim 10, wherein the first delay means includes comparator means for comparing the signal of the light measuring means with that of the standard signal producing means and a logic circuit for delaying the time at which the output of the release signal producing means is produced, in synchronization with the count signal of the counter means in accordance with the output signal of the comparator means.

14. A camera having:

(a) a power source;
(b) diaphragm means for controlling the aperture;
(c) shutter control means for controlling the operation in accordance with the electrical signal;
(d) calculating means for calculating the exposure amount in accordance with the input information as to the photographing conditions; and
(e) counter means;

whereby interchangeable lenses including diaphragm devices can be mounted and dismounted, while the time from the release operation up to the production of the release signal is selectively delayed, comprising:

(1) shutter release means having first switch means which is operated by the first step of the shutter release operation and second switch means which is operated by the second step of the shutter relezse operation;

(2) light measuring means for producing an electrical signal corresponding to the amount of the incident light from the object to be photographed;

(3) standard signal producing means for producing an electrical standard signal;

(4) first delay means, said means being supplied with the signal of the standard signal producing means and that of the light measuring means to delay the time at which the output is produced in selective synchronization with the count signal of the counter means in accordance with the magnitude of the light measuring output;

(5) winding up completion signal producing means, the means detecting the wound-up state of the camera to produce a winding up completion signal after lapse of a certain determined time after the detect signal has been provided; and (6) release signal producing means, said means including first switching means being supplied with the signal of the first delay means and that of the winding up completion signal producing means to be controlled in the switching operation, whereby the release signal of the camera is produced by means of the switching action of the first switching means.

15. A camera in accordance with claim 14, wherein the light measuring means includes converting means for converting the input signal of the incident light and temperature compensating means for compensating the fluctuation of the output signal of the converting means due to the change of temperature.

16. A camera in accordance with claim 15, wherein the light measuring means includes converting means for converting the input signal of the incident light and filter means for interrupting the high frequency components in the light measuring output signal.

17. A camera in accordance with claim 15, wherein the release signal producing means is a flip-flop circuit.

18. A camera having:
(a) an interchangeable lens with a diaphragm device which is mountable and dismountable;
(b) a power source;
(c) diaphragm control means for controlling the aperture;
(d) shutter control means for controlling the operation in accordance with the electrical signal;
(e) calculating means for calculating the exposure amount in accordance with the input information as to the photographing conditions;
(f) a pulse oscillator which produces pulses; and
(g) counting means which counts the pulses derived from the pulse oscillator;

whereby, in accordance with the magnitude of the light incident from the object to be photographed, the time from the release operation up to the production of the release signal is automatically delayed, comprising:

(1) shutter release means having first switch means which is operated by the first step of the shutter release operation and second switch means which is operated by the second step of the shutter release operation;
(2) light measuring means for producing an electrical signal corresponding to the magnitude of the incident light from the object to be photographed;
(3) standard signal producing means for producing an electrical standard signal;
(4) first delay means, said means being supplied with the signal of the standard signal producing means, that of the light measuring means and that of the counting means to delay the time at which the output signal is produced in selective synchronization with the count signal in accordance with the magnitude of the light measuring output;
(5) winding up completion detecting means which has switch means for detecting the wound-up state of the camera so as to produce a winding up completion signal; and
(6) second delay means which is connected with the standard signal producing means and the winding up completion detecting means; and which produces an electrical signal after lapse of a certain determined time after detecting the winding up completion signal;

(7) self-timer operation signal producing means which is provided with a setting signal of a self-timer and produces an electrical signal when the self-timer operation time has been completed; and
(8) release signal producing means which includes the following:
(i) first switching means which is connected with the first delay means and the second delay means to produce a switching signal; and
(ii) second switching means which is connected with the first switching means and the self-timer operation signal producing means, and which produces a release signal of the camera after the expiration of the self-timer.

19. A camera in accordance with claim 18, wherein the light measuring means includes converting means for converting the input signal of the incident light into an electrical signal and temperature compensating meand for compensating the fluctuation of the output signal of the converting means due to the change of temperature.

20. A camera in accordance with claim 19, wherein the first and second switching means includes a flip-flop circuit.

21. A camera in accordance with claim 18, wherein the light measuring means includes converting means for converting the input signal of the incident light into an electrical signal and filter means for interrupting the high frequency components of the light measuring output.

22. A camera in accordance with claim 18, wherein the second delay means includes a time constant circuit.

23. A camera in accordance with claim 18, further including battery check means connected with the power source and producing an electrical signal to the release signal producing means when the power source energy is sufficient to operate the camera.

24. A camera whose operation is controlled by means of a remote control device, having:
(a) light measuring means for producing an electrical signal corresponding to the magnitude of incident light from the object to be photographed;
(b) standard signal producing means for producing an electrical signal; and
(c) counter means for producing an electrical counting signal to sequentially control the camera; wherein the means for controlling the time at which the release signal of the camera is produced is comprised of:
(1) first delay means, said means being supplied with the signal of the light measuring means, that of the standard signal producing means and that of the counter means so as to delay the time at which the output is produced, in accordance with the magnitude of the output signal of the light measuring means;
(2) signal terminal means for transmitting an electrical signal from the remote control device;
(3) winding up completion detecting means for detecting the wound-up state of the camera to produce a winding up completion signal;
(4) second delay means which is connected with the wind-up completion detecting means and produces an electrical signal after lapse of a certain determined time after detecting the winding up completion signal; and
(5) release signal producing means, said means being supplied with the signal of the first and second delay means and that of the signal terminal means to produce the release signal of the camera.

25. A camera whose release operation is controlled by means of a remote control device, having:
(a) a power source;
(b) diaphragm control means for controlling the aperture;
(c) shutter control means for controlling the operation in accordance with the electrical signal;
(d) counter means for counting an electrical counting signal for control of the camera; and
(e) computation means for computing the exposure amount in accordance with the input information as to the photographing conditions, comprising:
   (1) light measuring means for producing an electrical signal corresponding to the magnitude of incident light from the object to be photographed;
   (2) standard signal producing means for producing an electrical standard signal;
   (3) signal terminal means for transmitting an electrical signal from the remote control means;
   (4) first delay means, said means being supplied with the signal of the light measuring means, that of the standard signal producing means and that of the counter means so as to delay the time at which the output is produced, in accordance with the magnitude of the output signal of the light measuring means;
   (5) winding up completion detecting means for detecting the wound-up state of the camera to produce a winding up completion signal;
   (6) second delay means connected with the winding up completion detecting means and producing an electrical signal after lapse of a certain determined time after detecting the winding up completion signal; and
   (7) release signal producing means, said means being connected at least to the first and second delay means and the signal terminal means to produce a release signal of the camera in order to actuate the diaphragm control means.

26. A camera in accordance with claim 25, further including battery check means connected with the power source and producing an electrical signal to the release signal producing means when the power source energy is sufficient to operate the camera.

27. A camera in accordance with claim 25, further including self-timer operation signal producing means to which is supplied a setting signal of a self-timer and further produces an electrical signal when the self-timer operation time is completed and which is connected with the release signal producing means.

28. A camera comprising:
(a) release means for carrying out the release operation of a camera;
(b) a light measuring circuit for measuring the brightness of the object to be photographed, by means of the release operation of the camera;
(c) an exposure control mechanism for controlling the exposure of the camera;
(d) control means for controlling the drive of the exposure control mechanism;
(e) delay means for delaying the time at which the output of the control means is produced in accordance with the magnitude of the output signal of the light measuring circuit; and
(f) locking means for locking the operation of the camera if the operation of the control means is not carried out by means of the delay signal from the delay means.

29. A camera in accordance with claim 28, further comprising display means for displaying the locked state of the camera by means of the signal from the locking means.

30. A camera having:
(a) release means having first switch means which is operated by the first step of the release operation and a second switch means which is operated by the second step of the release operation;
(b) light measuring means for producing an electrical signal corresponding to the magnitude of the incident light from the object to be photographed;
(c) winding up completion detecting means for detecting the wound-up state of the camera to produce a winding up completion signal;
(d) counting means which produces a counting signal, wherein the means for detecting the improper release operation to lock the release operation of the camera, comprising:
   (1) standard signal producing means for producing an electrical standard signal;
   (2) first delay means, said means being supplied with the signal of the standard signal producing means, that of the light measuring means and that of the counting means to delay the time at which the output signal is produced, in accordance with the magnitude of the light measuring output;
   (3) second delay means which is connected with the standard signal producing means and the winding up completion detecting means and produces an electrical signal after lapse of a certain determined time after detecting the winding up completion signal;
   (4) pulse producing means for detecting a state of the release operation which is connected with the release means and the second delay means, and which produces a release operation signal; and
   (5) release operating locking means, said means being supplied at least with the signal of the first delay means and that of the pulse producing means to prevent the output of the release operation signal of the camera before the signal from the first delay means.

31. A camera in accordance with claim 30, wherein the means for locking the release operation further includes alarm display means, said means connected with the release operation locking means, and display a state of release locking.

32. A camera in accordance with claim 30, wherein the release operation locking means consists of an electrical logic circuit.

33. A camera sensing the light incident from the object to control the exposure in accordance with the brightness information of the object, having:
(a) a power source;
(b) diaphram means;
(c) diaphragm control means;
(d) shutter means;
(e) shutter control means for controlling the operation in accordance with the electrical signal;
(f) computation means for computing the exposure amount in accordance with input information as to photographing conditions;
(g) a pulse oscillator which produces pulses;

(h) counting means which counts the pulses derived from the pulse oscillator and outputs a counting signal;

whereby the improper release operation is detected to lock the release operation of the camera, comprising:
(1) shutter release means having first switch means which is operated by the first step of the shutter operation and second switch means which is operated by the second step of the shutter release operation;
(2) light measuring means for producing an electrical signal corresponding to the magnitude of the incident light from the object to be photographed;
(3) standard signal producing means for producing an electrical standard signal;
(4) first delay means, sad means being supplied with the signal of the standard signal producing means, light measuring means and counting means to delay the time at which the output signal is produced, in selective synchronization with the counting signal in accordance with the magnitude of the light measuring output;
(5) winding up completion detecting means for detecting the wound-up state of the camera to produce a winding up completion signal;
(6) second delay means which is connected with the standard signal producing means and the winding up completion detecting means and produces an electrical signal after lapse of a certain determined time after detecting the winding up completion signal;
(7) pulse producing means for detecting a state of the release operation which is connected with the shutter release means and the second delay means and produces an electrical signal;
(8) release signal producing means, said means being supplied at least with the signal of the second delay means for producing a release signal of the camera and actuating the diaphragm control means; and
(9) release locking means, said means being supplied with the signal of the pulse producing means and the first delay means to prevent the production of the release signal from the release signal producing means when a signal is produced from the pulse producing means before a signal in accordance with the object brightness is produced from the first delay means.

34. A camera in accordance with claim 33, further comprising release alarm means, and release alarm means being supplied with the output signal of the release locking means and the input signal of the pulse producing means, and for providing alarm indication of a state of the release locking.

35. A camera in accordance with claim 34, in which the release alarm means has a display means, and the display means displays the state of release locking.

36. A camera on which an interchangeable lens within a diaphragm device can be mounted, having:
(a) a power source;
(b) diaphragm control means for controlling the aperture;
(c) shutter means;
(d) shutter control means for controlling the operation in accordance with the electrical signal;
(e) computing means for computing the exposure amount in accordance with input information as to the photographing condition;
(f) a pulse oscillator which generates pulses;
(g) counting means wich counts the pulses derived from the pulse oscillator and produces a counting signal, comprising:
(1) shutter release means, said means including at least two switch means for the light measurement and the release operation;
(2) light measuring means which is supplied by one of the switches of the shutter release means and produces an electrical signal corresponding to the magnitude of the incident light from the object to be photographed;
(3) first delay means, said means controlling the time at which the output signal is produced, in accordance with the magnitude of the light measuring output;
(4) second delay means which produces an electrical signal after lapse of a certain determined time after detecting the winding up completion signal of the camera;
(5) pulse producing means for detecting a state of the release operation which is connected with the shutter release means and the second delay means and produces an electrical signal;
(6) a logic circuit for locking of the release operation, said circuit being supplied with the signal of the pulse producing means and first delay means to produce a signal for preventing the improper operation of the camera release due to the difference between the closing time of the release operation switch and the time at which the output of the first delay means is produced and a signal for displaying the proper operation of the camera release; and
(7) release signal producing means, said means being supplied at least with the output signal of the logic circuit to produce the camera release signal when a signal displaying the proper release operation is supplied and prevents the production of the release signal when the prevention signal is provided.

37. A camera in accordance with claim 36, further comprising release operation alarm display means, said means being supplied with the input signal of the pulse producing means and the output signal of the release signal producing means for displaying an alarm indication when the camera release operation is improper.

* * * * *